(12) United States Patent
Suh et al.

(10) Patent No.: US 9,736,452 B2
(45) Date of Patent: *Aug. 15, 2017

(54) BROADCAST RECEIVER AND VIDEO DATA PROCESSING METHOD THEREOF

(71) Applicant: LG Electronics Inc., Seoul (KR)

(72) Inventors: Jong Yeul Suh, Seoul (KR); Jeong Hyu Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 326 days.

This patent is subject to a terminal disclaimer.

(21) Appl. No.: 14/570,402

(22) Filed: Dec. 15, 2014

(65) Prior Publication Data

US 2015/0097933 A1   Apr. 9, 2015

Related U.S. Application Data

(63) Continuation of application No. 13/144,771, filed as application No. PCT/KR2009/007108 on Dec. 1, 2009, now Pat. No. 8,947,504.

(Continued)

(51) Int. Cl.
*H04N 13/00* (2006.01)
*H04N 15/00* (2006.01)
(Continued)

(52) U.S. Cl.
CPC .......... *H04N 13/0029* (2013.01); *H04N 5/44* (2013.01); *H04N 13/0048* (2013.01);
(Continued)

(58) Field of Classification Search
CPC ...................... H04N 13/0285; H04N 13/0029
See application file for complete search history.

(56) References Cited

U.S. PATENT DOCUMENTS

2002/0009137 A1*  1/2002  Nelson ............... H04N 7/01
                                                        375/240.1
2003/0095177 A1    5/2003  Yun et al.
(Continued)

FOREIGN PATENT DOCUMENTS

CN      1954606 A      4/2007
CN      1998233 A      7/2007
(Continued)

OTHER PUBLICATIONS

Office Action of Chinese Patent Office in Appl'n No. 201510232384.4, dated Aug. 17, 2016, 9 pages.
(Continued)

*Primary Examiner* — Joseph Ustaris
*Assistant Examiner* — Rebecca Volentine
(74) *Attorney, Agent, or Firm* — Dentons US LLP (57) ABSTRACT

A broadcast receiver and a method for processing video data are disclosed. The method for controlling a three dimensional (3D) video display output of a broadcast receiver includes receiving a broadcast signal including a video stream, wherein the video stream includes a plurality of video stream sections having different view points, acquiring view point information indicating corresponding view points of the video stream sections, and controlling a three dimensional (3D) video display output of the video stream according to the obtained view point information.

8 Claims, 8 Drawing Sheets

Related U.S. Application Data (60) Provisional application No. 61/148,035, filed on Jan. 28, 2009.

(51) Int. Cl.

| | | |
|---|---|---|
| *H04N 7/12* | (2006.01) | |
| *H04N 11/02* | (2006.01) | |
| *H04N 11/04* | (2006.01) | |
| *H04N 13/02* | (2006.01) | |
| *H04N 19/597* | (2014.01) | |
| *H04N 5/44* | (2011.01) | |
| *H04N 13/04* | (2006.01) | |
| *H04N 21/431* | (2011.01) | |
| *H04N 21/434* | (2011.01) | |
| *H04N 21/81* | (2011.01) | |
| *H04N 21/845* | (2011.01) | |

(52) U.S. Cl.
CPC ..... *H04N 13/0066* (2013.01); *H04N 13/0285* (2013.01); *H04N 13/0454* (2013.01); *H04N 19/597* (2014.11); *H04N 21/431* (2013.01); *H04N 21/4343* (2013.01); *H04N 21/4348* (2013.01); *H04N 21/816* (2013.01); *H04N 21/8451* (2013.01); *H04N 2213/007* (2013.01)

(56) References Cited

U.S. PATENT DOCUMENTS

| | | |
|---|---|---|
| 2004/0027452 A1 | 2/2004 | Yun et al. |
| 2004/0066846 A1* | 4/2004 | Yun .................. H04N 13/0048 375/240.08 |
| 2005/0062846 A1 | 3/2005 | Choi et al. |
| 2005/0084006 A1* | 4/2005 | Lei .................. H04N 19/597 375/240.1 |
| 2006/0013490 A1 | 1/2006 | Sun |
| 2006/0028489 A1 | 2/2006 | Uyttendaele et al. |
| 2006/0221178 A1 | 10/2006 | Yun et al. |
| 2007/0008575 A1 | 1/2007 | Yun et al. |
| 2007/0177813 A1* | 8/2007 | Yang .................. H04N 19/597 382/233 |
| 2007/0216805 A1 | 9/2007 | Yamamoto et al. |
| 2008/0089428 A1 | 4/2008 | Nakamura et al. |
| 2008/0158346 A1 | 7/2008 | Okamoto et al. |
| 2008/0181228 A1 | 7/2008 | Hannuksela et al. |
| 2008/0317124 A1* | 12/2008 | Cho .................. H04N 19/597 375/240.08 |
| 2009/0003439 A1 | 1/2009 | Wang et al. |
| 2009/0092335 A1* | 4/2009 | Kim .................. H04N 13/004 382/285 |
| 2009/0153649 A1 | 6/2009 | Hirooka et al. |
| 2009/0219282 A1 | 9/2009 | Kim et al. |
| 2009/0220213 A1 | 9/2009 | Ogawa et al. |
| 2009/0304081 A1* | 12/2009 | Bourge .............. H04N 7/0112 375/240.15 |
| 2010/0086285 A1* | 4/2010 | Sasaki ................ G11B 27/105 386/212 |
| 2010/0110162 A1 | 5/2010 | Yun et al. |
| 2010/0165077 A1 | 7/2010 | Yin et al. |
| 2010/0208042 A1 | 8/2010 | Ikeda et al. |
| 2011/0080468 A1 | 4/2011 | Oshima et al. |
| 2012/0212579 A1 | 8/2012 | Frojdh et al. |

FOREIGN PATENT DOCUMENTS

| | | |
|---|---|---|
| CN | 101292538 A | 10/2008 |
| CN | 101312542 A | 11/2008 |
| CN | 102396236 A | 3/2012 |
| EP | 1389020 A1 | 2/2004 |
| EP | 1612732 A2 | 1/2006 |
| JP | 2003260028 A | 9/2003 |
| KR | 1020080100752 A | 11/2008 |
| WO | 2005053321 A1 | 6/2005 |
| WO | 2005114998 A1 | 12/2005 |
| WO | 2007047736 A2 | 4/2007 |
| WO | 2008038961 A1 | 4/2008 |
| WO | 2008140190 A1 | 11/2008 |
| WO | 2008156318 A2 | 12/2008 |

OTHER PUBLICATIONS

JeongEun Lim, et al., "A multiview sequence CODEC with view scalability", Signal Processing: Image Communication 19, pp. 239-256, 2004.

B. Tseng, et al., "Multiviewpoint Video Coding with MPEG-2 Compatibility", IEEE Trans. on CSVT, vol. 6, No. 4, pp. 414, 415 and 417, Aug. 1996.

\* cited by examiner

| Syntax | No. of bits | Format |
|---|---|---|
| user_data_registered_itu_t_t35 ( ) { | | |
|     itu_t_t35_country_code | 8 | bslbf |
|     itu_t_t35_provider_code | 16 | bslbf |
|     user_identifier | 32 | bslbf |
|     user_structure ( ) | | |
| } | | | itu_t_t35_country_code = 0xB5
itu_t_t35_provider_code = 0x0031
user_identifier = 0x4741 3934

| Syntax | No. of bits | Format |
|---|---|---|
| ATSC_user_data ( ) { | | |
|     user_data_type_code | 8 | uimsbf |
|     user_data_type_structure ( ) | | |
| } | | | user_data_type_code = 0x10 view_branch_data ( )

Fig. 4

| Syntax | No. of bits | Format |
|---|---|---|
| view_branch_data ( ) { | | |
|     left_right_view_flag | 1 | bslbf |
|     reserved | 7 | bslbf |
| } | | |

Fig. 5

| Syntax | No. of bits | Format |
|---|---|---|
| PES_packet ( ) { | | |
|     packet_start_code_prefix | 24 | bslbf |
|     stream_id | 8 | uimsbf |
|     PES_packet_length | 16 | uimsbf |
|     for (i=0; i < PES_packet_length; i++) { | | |
|         PES_packet_data_byte | 8 | bslbf |
|     } | | |
| } | | |

| Syntax | No. of bits | Format |
|---|---|---|
| view_branch_segment ( ) { | | |
|     data_identifier | 8 | bslbf |
|     sync_byte | 8 | bslbf |
|     base_view_flag | 1 | bslbf |
|     number_of_scenes | 15 | uimsbf |
|     for (i=0; i < number_of_scenes; i++) { | | |
|         left_right_view_flag | 1 | bslbf |
|         reserved | 7 | bslbf |
|         start_frame_num | 16 | uimsbf |
|         end_frame_num | 16 | uimsbf |
|     } | | |
| } | | |

BROADCAST RECEIVER AND VIDEO DATA PROCESSING METHOD THEREOF

This application is a continuation application of U.S. patent application Ser. No. 13/144,771, filed Jul. 15, 2011, which claims priority to National Stage Entry of International Application No. PCT/KR2009/007108, filed on Dec. 1, 2009, and claims the benefit of U.S. Provisional Patent Application No. 61/148,035, filed Jan. 28, 2009, both of which are hereby incorporated by reference for all purposes as if fully set forth herein in their entireties.

TECHNICAL FIELD

The present invention relates to a broadcast receiver and a method for processing video data for use in the broadcast receiver, and more particularly to a broadcast receiver for receiving and processing three dimensional (3D) video data and a method for processing video data for use in the broadcast receiver.

BACKGROUND ART

Generally, a three dimensional (3D) image (or a stereoscopic image) provides user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view their associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE OF INVENTION

Technical Problem

Accordingly, the present invention is directed to a broadcastreceiver and a video data processing method thereof, that substantially obviate one or more problems due to limitations and disadvantages of the related art.

An object of the present invention is to provide a method for allowing either a reception device capable of displaying 3D video data or another reception device capable of displaying only 2D video data to properly process video data, and providing a user with more efficient and convenient broadcast environments by outputting an appropriate image to each reception device.

Solution to Problem

The object of the present invention can be achieved by providing a method for controlling a three dimensional (3D) video display output of a broadcast receiver including receiving a broadcast signal including a video stream, wherein the video stream includes a plurality of video stream sections having different view points, acquiring view point information indicating corresponding view points of the video stream sections, and controlling a three dimensional (3D) video display output of the video stream according to the obtained view point information.

In another aspect of the present invention, provided herein is a broadcast receiver including a tuner configured to receive a broadcast signal, a demultiplexer configured to extract a video stream from the broadcast signal, wherein the video stream includes a plurality of video stream sections having different view points, a decoder configured to decode the extracted video stream, and a three dimensional (3D) display controller configured to obtain view point information indicating corresponding view points of the video stream sections, and control a 3D video display output of the video stream according to the obtained view point information.

Advantageous Effects of Invention

According to embodiments of the present invention, the broadcastreceiver recognizes a view point of each image contained in a received video stream, such that it controls a 3D display output.

According to embodiments of the present invention, the broadcastreceiver controls the output of video data in response to each view point, such that it can accurately display the 3D image, resulting in implementation of the 3D effect.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the terms defined by the applicant be understood on the basis of their meanings in the present invention.

The 3D image display method includes a stereoscopic imaging scheme in which two view points are considered and a multi-view imaging scheme in which three or more view points are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

When the MVC scheme is additionally applied to the AVC scheme or the right/left image sequences are coded using only the AVC scheme so as to implement the stereoscopic display, one point to be duly considered when broadcasting corresponding 3D content is compatibility with the 2D broadcast receiver of the related art. For the related broadcast receiver incapable of supporting the 3D image display, if one of right and left view images is encoded and transmitted according to a backward compatible method, the 2D broadcast receiver recognizes and outputs only the corresponding signal, such that it may be possible for a user to view the corresponding contents through the related device.

In one embodiment of the 3D content transmission, one of right/left view images is selected and the selected image is encoded into a 2D compatible signal, such that the 2D compatible signal is transferred. However, in this case, a video stream, to be transmitted as a 2D image within the same content in consideration of a manufacturer's intention, an image effect, or a viewing environment, may be edited into image sequences having different view points in respective sections, such that the resultant image sequences may be transmitted. For example, when generating the 2D video stream in respective sections within the same content, data of an initial 10 minutes is assigned to the left view image and data of the next 15 minutes is assigned to the right view image, such that the 2D video stream is formed. For compatibility with the related device, the formed 2D image stream is backward-compatible coded (e.g., AVC-coded) through a single stream, such that the coded result is transferred.

Figure 1:
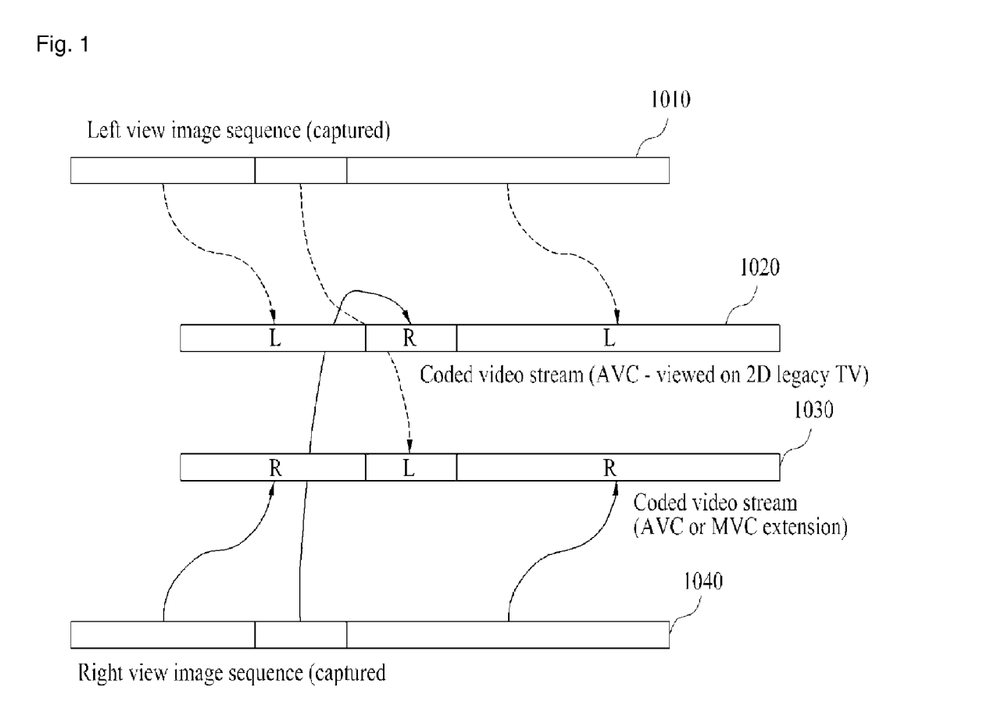
FIG. 1 is a conceptual diagram illustrating a method for transferring a 3D content video stream according to one embodiment of the present invention.

FIG. 1 is a conceptual diagram illustrating a method for transferring a 3D content video stream according to one embodiment of the present invention.

Referring to FIG. 1, a left view image sequence 1010 is captured and edited at a left view and a right view image sequence 1040 is captured and edited at a right view, such that the 3D content is manufactured.

In order to implement a display function for the 2D broadcast receiver, a transmission system selects one of left and right view image sequences 1010 and 1040, and codes and transmits the selected one. However, if required, the video stream 1020 acquired when the left view image and the right view image are selected and arranged may be coded and transmitted.

In FIG. 1, the video stream 1020, in which a left view video stream section, a right view video stream section, and the left view video stream section are arranged, is an AVC-coded video stream capable of being displayed by the 2D broadcast receiver for compatibility with the related device. In this case, the video stream section indicates a video stream section contained in a video stream of different view points, and this section may be configured in units of a video frame, a picture, or a sequence.

An additional video stream 1030 for the 3D broadcast receiver is encoded by the AVC scheme or the MVC scheme, and transmitted.

There is a need for the 2D broadcast receiver to receive the video stream 1020 having been coded and transmitted for the 2D broadcast receiver, decode the received video stream 1020, and output the decoded result. However, when the 3D broadcast receiver receives the video stream 1020 for the 2D broadcast receiver and the additional video stream 1030, and outputs the received video streams 1020 and 1030 without any change, there may arise an unexpected section in which the left view image and the right view image are replaced with each other.

In other words, if a view point is changed to another view point within the coded video streams 1020 and 1030 as shown in FIG. 1, the 3D image may not be normally displayed under the condition that the 3D output is incorrectly controlled in response to a corresponding view point. When decoding the 3D video stream, the right view image section must be transmitted to a display output unit for displaying the right view image, and the left view image section must be transmitted to a display output unit for displaying the left view image. The change or control of such view points may even be applied to the multi-view image.

View branching metadata indicating signaling data, that informs the coded image sequence of a corresponding image's view point in units of a picture, frame or sequence, will hereinafter be described with reference to the annexed drawings. A method for delivering the view branching metadata and broadcast receiver's operations performed when the view branching metadata is received will hereinafter be described in detail.

Firstly, a method for including view branching metadata in a video Elementary Stream (ES) and transmitting the resultant video ES in accordance with one embodiment of the present invention will hereinafter be described.

In case of using H.264 (or AVC) video data or MVC extension video data, a video ES may include a Supplemental Enhancement Information (SEI) message. The SEI message indicates additional information unnecessary for a decoding process of a Video Coding Layer (VCL). In addition, the SEI message may include each picture s timing information related to a Hypothetical Reference Decoder (HRD), information of a pan/scan function (i.e., a function for reading and displaying some parts of the decoded image), information necessary for random access, information independently defined by a user, and the like.

Figure 2:
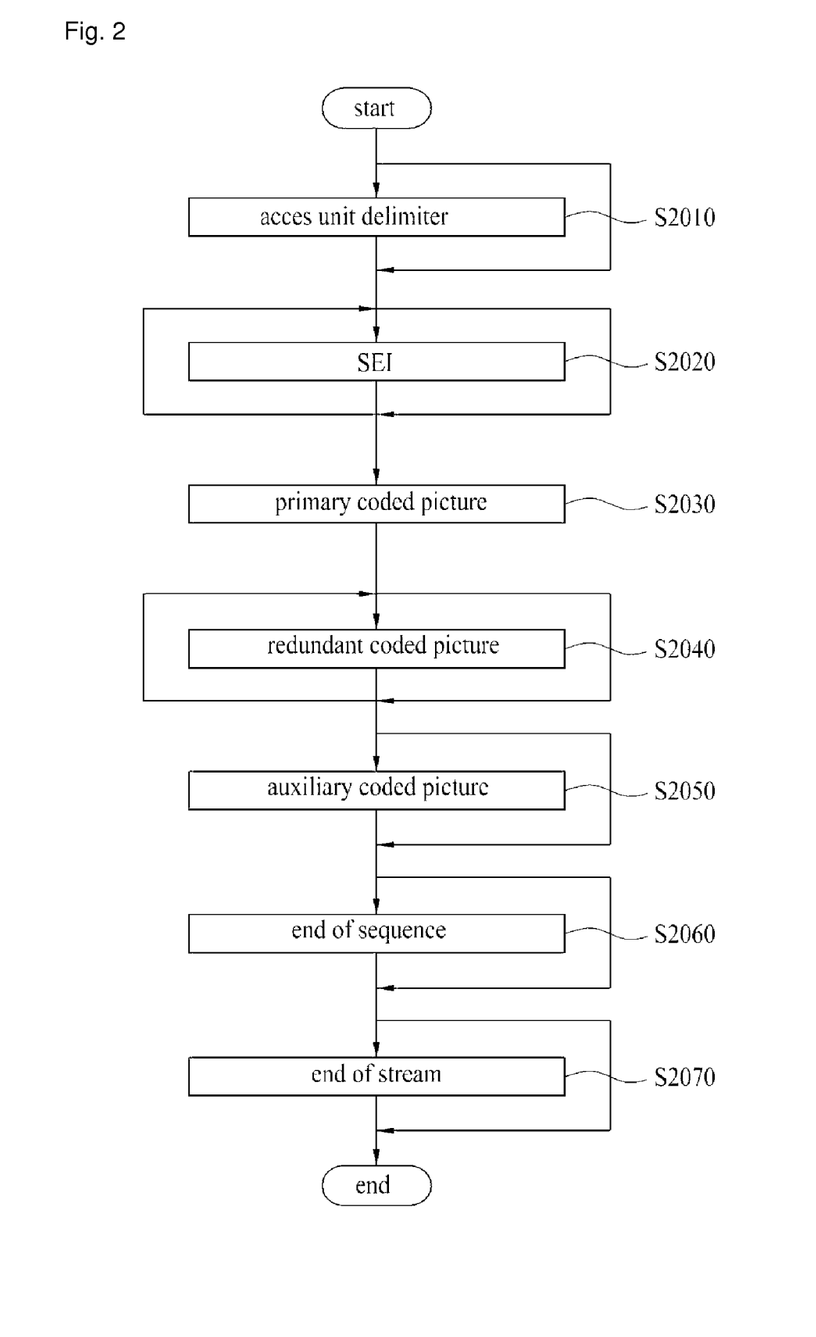
FIG. 2 is a flowchart illustrating the order of processing a video stream including a Supplemental Enhancement Information (SEI) message according to one embodiment of the present invention.

FIG. 2 is a flowchart illustrating the order of processing a video stream including an SEI message according to one embodiment of the present invention.

A method for processing an access unit shown in FIG. 2 will hereinafter be described in detail.

When an access unit delimiter Network Abstraction Layer (NAL) unit is present at step S2010, it shall be the first NAL unit. There shall be at most one access unit delimiter NAL unit in any access unit.

When any SEI NAL units are present at step S2020, they shall precede the primary coded picture at step S2030. When an SEI NAL unit containing a buffering period SEI message is present, the buffering period SEI message shall be the first SEI message payload of the first SEI NAL unit in the access unit.

The primary coded picture shall precede the corresponding redundant coded pictures. When redundant coded pictures are present at step S2040, they shall be ordered in ascending order of the value of redundant_pic_cnt.

When a sequence parameter set extension NAL unit is present, it shall be the next NAL unit after a sequence parameter set NAL unit having the same value of seq_parameter_set_id as in the sequence parameter set extension NAL unit.

When one or more coded slices of an auxiliary coded picture without partitioning NAL units is present at step S2050, they shall follow the primary coded picture and all redundant coded pictures (if any).

When an end of sequence NAL unit is present at step S2060, it shall follow the primary coded picture and all redundant coded pictures (if any) and all coded slices of an auxiliary coded picture without partitioning NAL units (if any).

When an end of stream NAL unit is present at step S2070, it shall be the last NAL unit.

In one embodiment of the present invention, a transmission system may include view branching metadata in the SEI area of the video ES, and transmit the resultant video ES.

Figure 3:
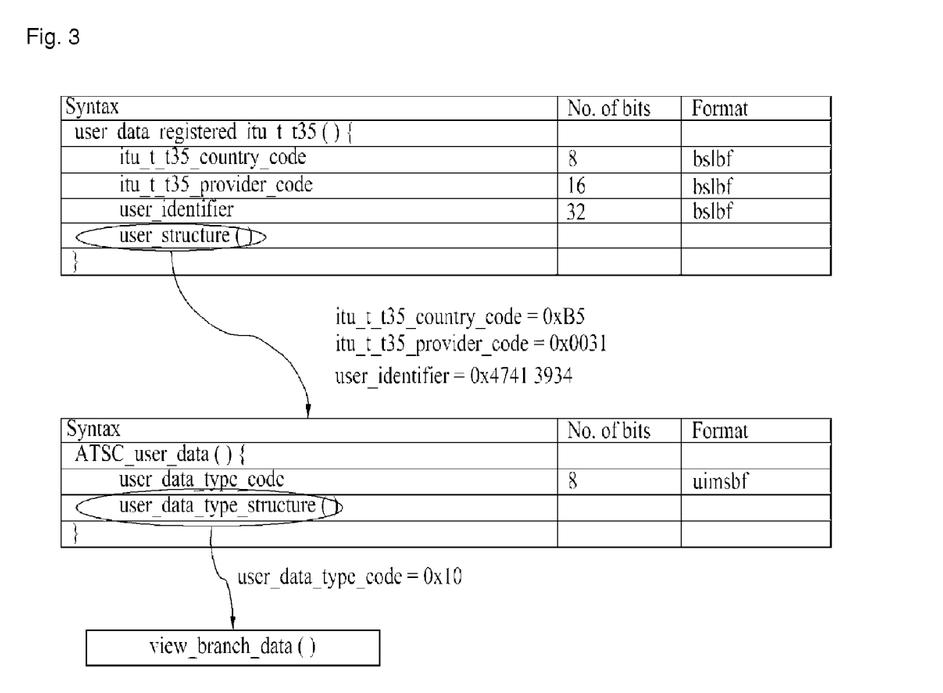
FIG. 3 shows a syntax structure of an SEI message including view branching metadata according to one embodiment of the present invention.

FIG. 3 shows a syntax structure of an SEI message including view branching metadata according to one embodiment of the present invention.

As can be seen from the SEI message of FIG. 3, the transmission system transmits additional information needed for broadcast application using 'user_identifier' and 'user_structure' fields included in a 'user_data_registered_itu_t_35( )' field in which an SEI payloadType value is set to 4. An 'ATSC_user_data( )' field is contained in the 'user_structure( )' field, and the transmission system is able to recognize that corresponding data is data 'view_branch_data' by referring to a 'user_data_type_code' field. A receiver is able to recognize which one of views is contained in a corresponding picture using fields contained in a 'view_branch_data( )' field of a 'user_data_type_structure' field.

Figure 4:
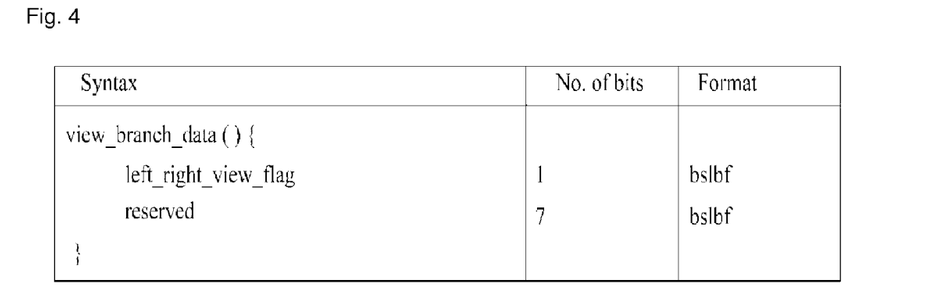
FIG. 4 shows a syntax structure of data view_branch_data according to one embodiment of the present invention.

FIG. 4 shows a syntax structure of view branch data 'view_branch_data' according to one embodiment of the present invention.

Referring to FIG. 4, a 'left_right_view_flag' field indicates whether a picture including the SEI message is a left view image or a right view image. In the embodiment shown in FIG. 4, if the 'left_right_view_flag' field is set to '0', this means that the picture including the SEI message is a left view image. Otherwise, if the 'left_right_view_flag' field is set to '1', this means that the picture including the SEI message is a right view image.

For convenience of description and better understanding of the present invention, the embodiment shown in FIG. 4 shows the stereoscopic image as an example. In case of the multi-view image, two or more bits are assigned to the 'view_flag' field so as to indicate a view point of a corresponding image.

A method for transmitting view branching metadata may be made available in various ways, and associated embodiments will hereinafter be described in detail.

In one embodiment, view branching metadata may be transmitted at the position of an Instantaneous Decoding Refresh (IDR) picture indicating the head picture of an image sequence. In association with the IDR picture, because the H.264/AVC scheme generally allows an inter-frame prediction indicating that a P picture located behind an I picture refers to other picture located in front of the I picture, it is difficult to fully initialize a status using only a general I picture, such that the IDR picture is used to solve this problem.

In another embodiment, view branching metadata may be transmitted every picture position.

In another embodiment, view branching metadata may be transmitted at a start position of each sequence. In this case, previous view branching metadata may be maintained until new view branching metadata is received.

In another embodiment, view branching metadata may be transmitted every picture position, and at the same time a corresponding value may be kept at the same value within one sequence. In other words, if one view point is selected in a specific section for a 2D video sequence, a video sequence may be coded such that the same view point is maintained in one sequence.

In addition, other embodiments may also be proposed for each case that stereoscopic video data is transferred as two streams or one stream.

In one embodiment, if stereoscopic video data is transferred as two streams, view branching metadata is basically included in a base view video stream and then transmitted. Even in the case of processing an extended view video stream, it is possible to use information of a view point included in the base view video stream. For example, in the case of the stereoscopic video stream, a view point of the extended view video stream is opposite to that of the base view video stream, such that it is possible to use information of a view point included in the base view video stream even in the case of processing the extended view video stream. In another embodiment, the base view video stream may even include the view point information of the extended view video stream, and transmits the resultant base view video stream.

In addition, view branching metadata may be included in the extended view video stream and transmitted, or may be included in each of all streams and transmitted.

In another embodiment, if the stereoscopic video data is transferred as one stream, the left view image and the right view are mixed in the form of side-by-side, top-bottom, checkerboard, horizontally/vertically interleaved format, etc., and then transmitted. Even in this case, view branching metadata is included in the video data stream as described above, a 2D broadcast receiver or a 3D broadcast receiver for a 2D mode reconstructs a 2D sequence composed of a left view image or a right view image using the view branching metadata, and may display the reconstructed 2D sequence.

A plurality of embodiments related to view point identification may be applied to the stereoscopic video data formed in two streams.

In one embodiment, left/right identification for a stream may be initially assigned using view branching metadata, such that a branching may be carried out. In another embodiment, basic view point identification for a corresponding stream may be assigned via a flag indicating a view point, and the branching may be carried out via view branching metadata.

Hereinafter, a method for constructing an additional Packetized Elementary Stream (PES) packet including view branching metadata and transmitting the constructed PES packet in accordance with one embodiment of the present invention will be described in detail.

Instead of including view branching metadata in the video stream as described above, a transmission system may construct the view branching metadata of an additional independent PES packet except for video and audio streams, and then transmit the constructed view branching metadata.

Figure 5:
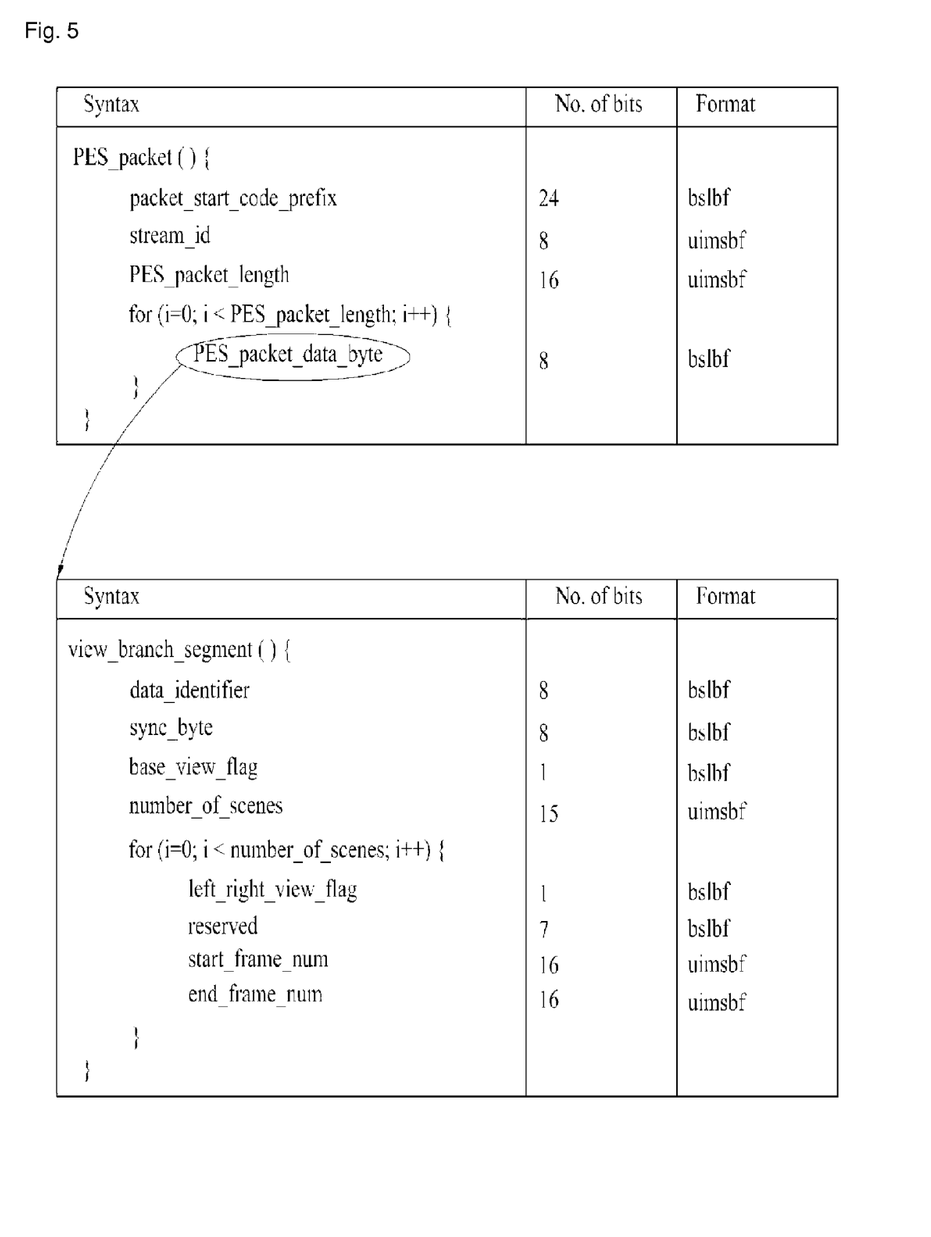
FIG. 5 shows a syntax structure of a Packetized Elementary Stream (PES) packet including view branching metadata according to one embodiment of the present invention.

FIG. 5 shows a syntax structure of a PES packet including view branching metadata according to one embodiment of the present invention.

In FIG. 5, a 'stream_id' field has a value of '0xBF', and indicates a stream ID of a PES including view branching metadata.

When different private data PESs are serviced, a 'data_identifier' field indicates that a corresponding PES is equal to a PES related to view branching metadata.

A 'base_view_flag' field indicates whether a stream to which metadata transferred via 'view_branch_segment' is applied is a base view stream (e.g., AVC stream) or an extended view stream (e.g., MVC extension stream).

A 'number_of scenes' field indicates the number of scenes contained in a video stream interacting with view branching metadata, and each scene includes one of the left view image and the right view image in case of a stereoscopic image.

A 'left_right_view_flag' field indicates whether a picture included in a corresponding frame is a left view image or a right view image. In the embodiment shown in FIG. 5, if the 'left_right_view_flag' field is set to '0', this means the picture is a left view image. Otherwise, if the 'left_right_view_flag' field is set to '1', this means that the picture is a right view image.

For convenience of description and better understanding of the present invention, the embodiment shown in FIG. 5 shows the stereoscopic image as an example. In case of the multi-view image, two or more bits are assigned to the 'view_flag' field so as to indicate a view point of a corresponding image. Information about a frame section related to a view point indicated by the 'left_right_view_flag' field may be acquired from a 'start_frame_num' field and an 'end_frame_num' field.

The 'start_frame_num' field indicates a frame number of a first picture of a corresponding scene, and may be represented by the decoding order or the displaying order in accordance with embodiments.

The 'end_frame_num' field indicates a frame number of the last picture of a corresponding scene, and may be represented by the decoding order or the displaying order.

Figure 6:
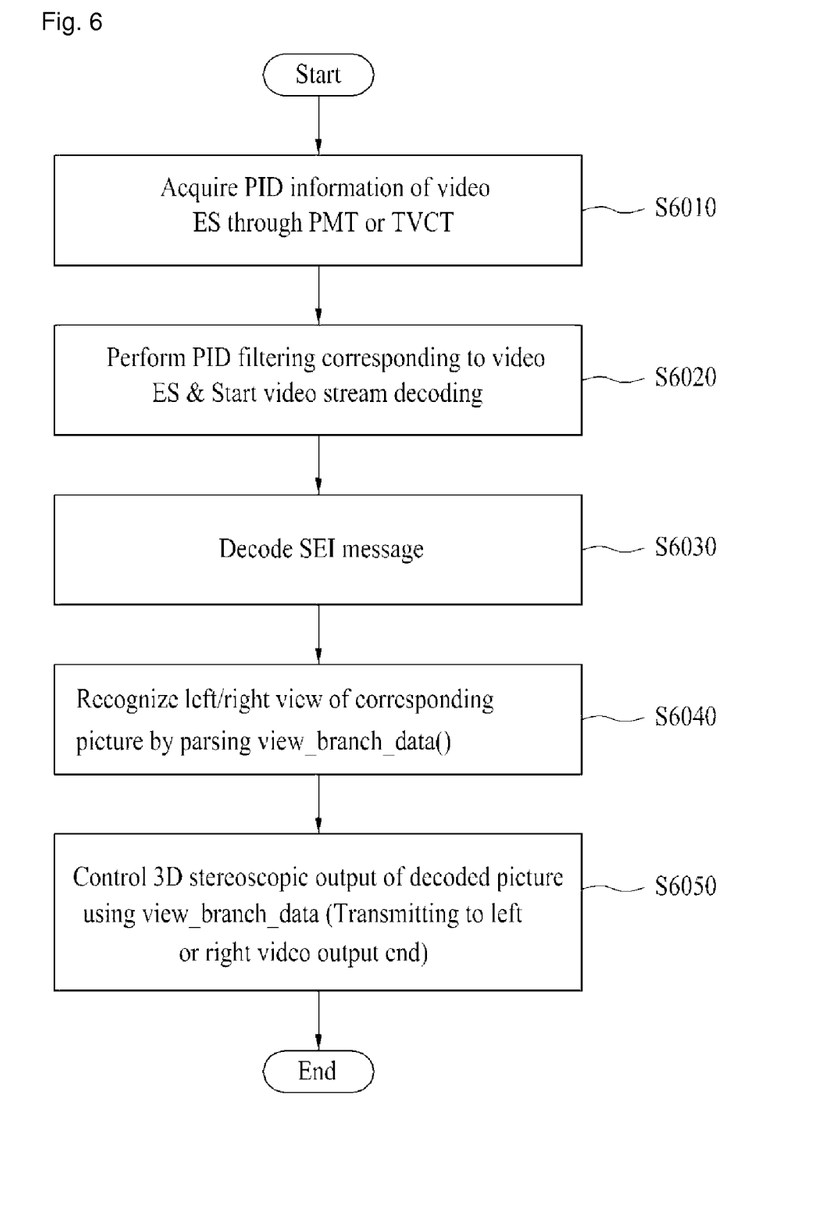
FIG. 6 is a flowchart illustrating a method for allowing a broadcast receiver to process video data when view branching metadata is contained in a video Elementary Stream (ES) according to one embodiment of the present invention.

FIG. 6 is a flowchart illustrating a method for allowing a broadcast receiver to process video data when view branching metadata is contained in a video Elementary Stream (ES) according to one embodiment of the present invention.

Referring to FIG. 6, a broadcast receiver receives a broadcast signal, parses Program and System Information Protocol (PSIP) information, and may acquire PID information of a video ES from a Program Map Table (PMT) or Terrestrial Virtual Channel Table (TVCT) contained in the PSIP information at step S6010. The broadcast receiver may filter a corresponding video ES by setting a filter using the acquired PID information, and then decode the extracted video stream at step S6020.

The broadcast receiver is able to decode the SEI message by decoding the video stream at step S6030. The decoding of the SEI message contained in the video stream may be carried out according to the method illustrated in FIGS. 2 and 3.

The broadcast receiver parses 'view_branch_data' contained in the SEI message, such that it is able to recognize a view point of a corresponding picture at step S6040. The embodiment shown in FIG. 6 discloses the case of the stereoscopic image as an example. In this embodiment of FIG. 6, a view point of a corresponding picture may be a left view or a right view.

The broadcast receiver controls the 3D stereoscopic output of the decoded picture using the view point information of the parsed view_branch_data at step S6050. In accordance with the 3D stereoscopic output control of the broadcast receiver, the left view image of the 3D stereoscopic image is output to the left view image output unit, and the right view image of the same is output to the right view image output unit, such that the 3D stereoscopic image may be displayed according to the intended 3D effect.

Figure 7:
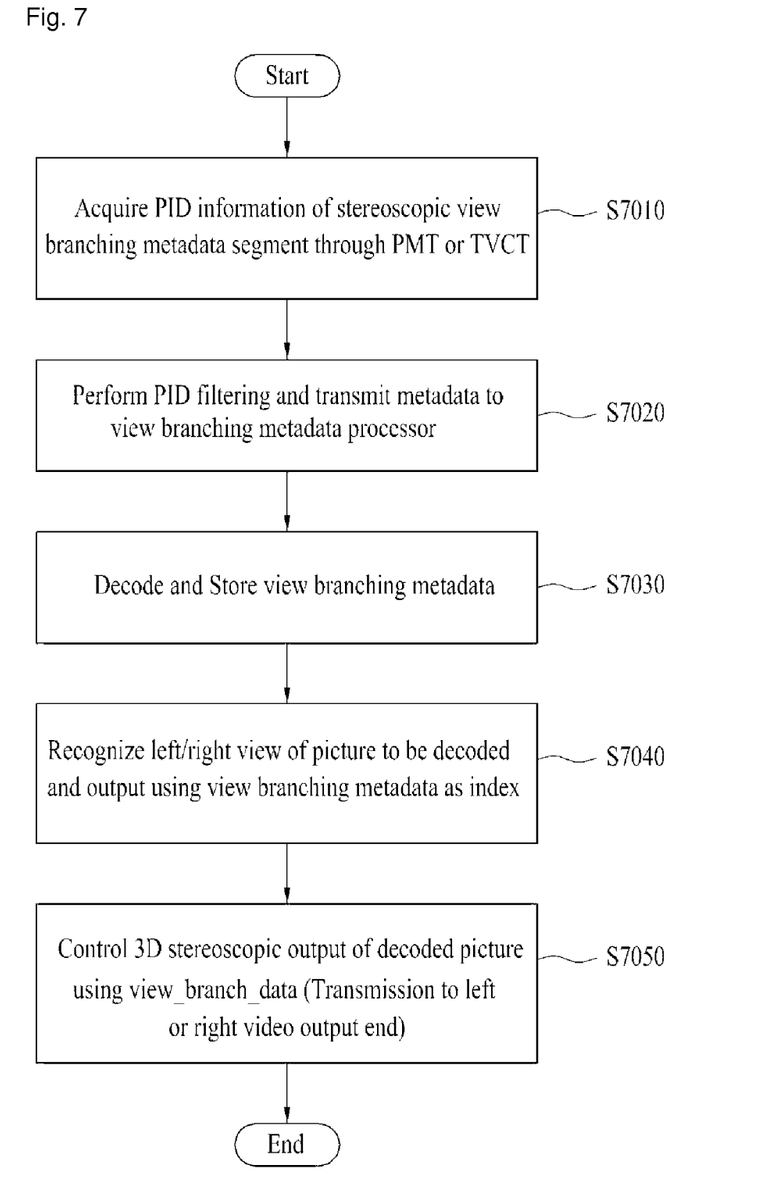
FIG. 7 is a flowchart illustrating a method for allowing a broadcast receiver to process video data when view branching metadata is contained in an additional PES packet according to one embodiment of the present invention.

FIG. 7 is a flowchart illustrating a method for allowing a broadcast receiver to process video data when view branching metadata is contained in an additional Packetized Elementary Stream (PES) packet according to one embodiment of the present invention.

Referring to FIG. 7, a broadcast receiver receives a broadcast signal, and parses Program and System Information Protocol (PSIP) information. The broadcast receiver may acquire PID information of a PES packet including view branching metadata from a PMT or TVCT contained in the parsed PSIP information at step S7010.

The broadcast receiver performs a filtering process using the acquired PID information, such that it may transmit the PES packet including the view branching metadata to a view branching metadata processor at step S7020. The view branching metadata processor may decode and store the received PES packet at step S7030.

The broadcast receiver may acquire a view point of a picture, to be decoded and output, using the decoded view branching metadata at step S7040. The embodiment shown in FIG. 7 discloses the case of the stereoscopic image as an example. In this embodiment of FIG. 7, a view point of a corresponding picture may be a left view or a right view.

The broadcast receiver controls the output of the decoded picture using the acquired view point information at step S7050. In accordance with the 3D stereoscopic output control of the broadcast receiver, the left view image of the 3D stereoscopic image is output to the left view image output unit, and the right view image of the same is output to the right view image output unit, such that the 3D stereoscopic image may be displayed according to the intended 3D effect.

Figure 8:
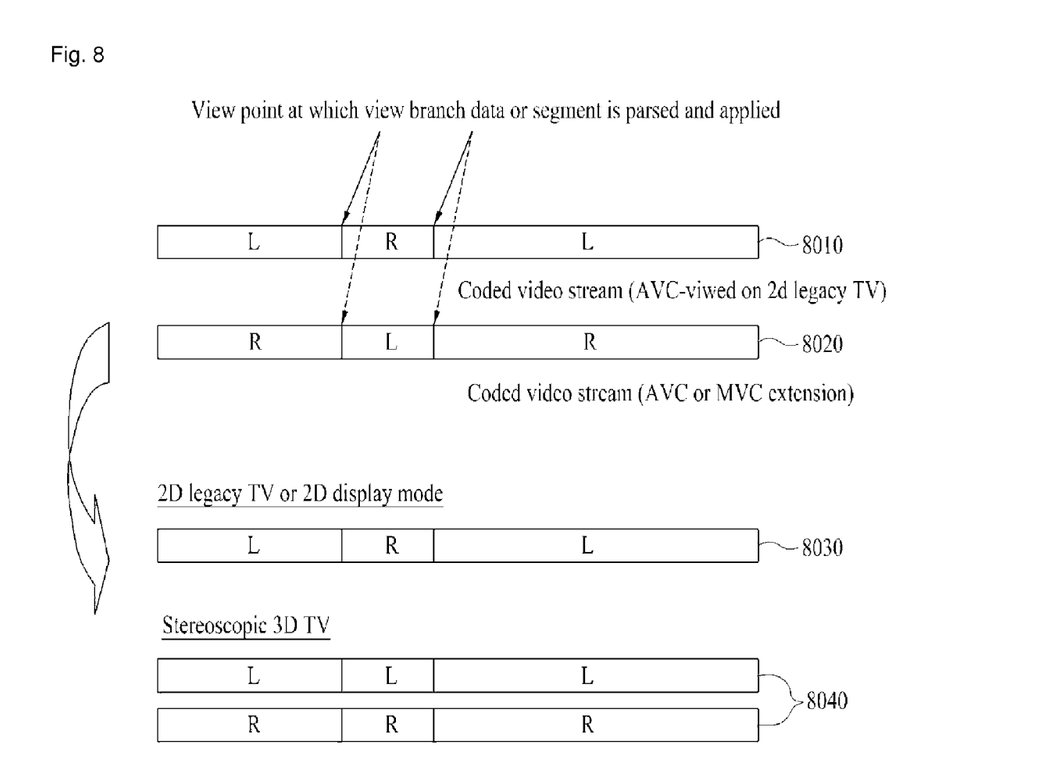
FIG. 8 is a conceptual diagram illustrating a method for controlling the output of a 3D video stream according to one embodiment of the present invention.

FIG. 8 is a conceptual diagram illustrating a method for controlling the output of a 3D video stream according to one embodiment of the present invention.

In FIG. 8, a 3D video stream is a stereoscopic image, a video stream 8010 of a base layer is coded according to the AVC scheme, and a video stream 8020 of an extended layer is coded according to the AVC or MVC extension scheme. The video stream 8010 of the base layer includes sections corresponding to the order of left view (L)→right view (R)→left view (L) (i.e., left-right-left sections), and the video stream 8020 of the extended layer includes sections corresponding to the order of right view (R)→left view (L)→right view (R) (i.e., right-left-right sections).

A 2D broadcast receiver or a 3D broadcast receiver for a 2D mode receives the video stream 8030 of the base layer, and outputs the received video stream 8030 without any change. A 3D broadcast receiver for a 3D mode processes view branching metadata as described above, and controls the output of the decoded video stream according to the acquired view point information. Accordingly, in the output video stream 8040, the left view image may be output to the left view image output unit, and the right view image may be output to the right view image output unit.

Figure 9:
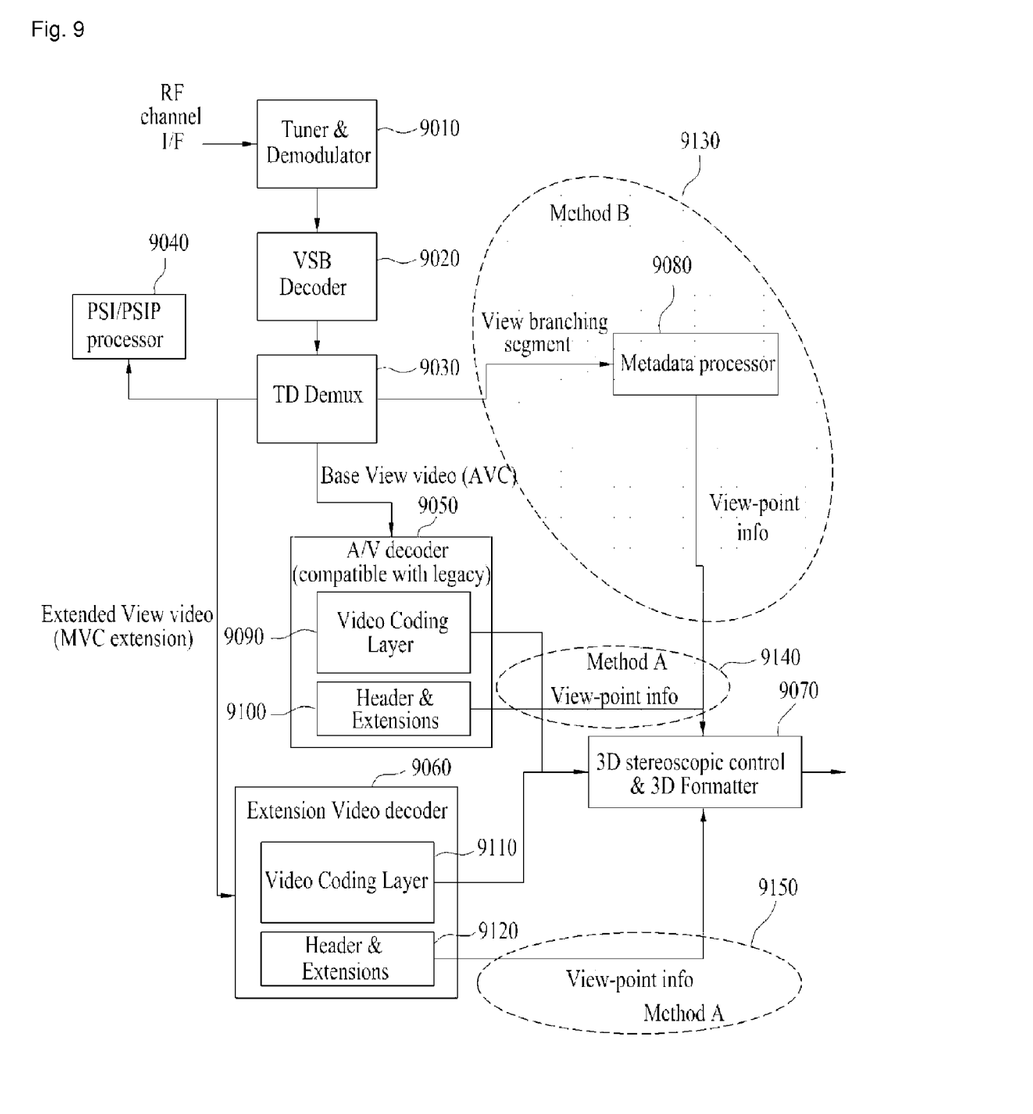
FIG. 9 is a block diagram illustrating constituent elements of a broadcast receiver capable of processing a 3D broadcast signal including view branching metadata according to one embodiment of the present invention.

FIG. 9 is a block diagram illustrating constituent elements of a broadcast receiver capable of processing a 3D broadcast signal including view branching metadata according to one embodiment of the present invention.

Referring to FIG. 9, a broadcast receiver includes a tuner and demodulator 9010, a Vestigial Side Band (VSB) decoder 9020, a Transport Packet (TP) demultiplexer (TP Demux) 9030, a PSI/PSIP processor 9040, an Audio/Video (A/V) decoder, an Extension video decoder 9060, and a 3D stereoscopic control and 3D formatter 9070 (hereinafter referred to as a 3D video processor 9070). In accordance with one embodiment of the present invention, the broadcast receiver may further include a metadata processor 9080. The A/V decoder 9050 includes a video coding layer 9090 for processing video data and a header & extensions 9100 for processing supplemental data. The Extension video decoder 9060 may include a video coding layer 9110 for processing video data and a Header & Extensions 9120 for processing supplemental data.

Besides, the broadcast receiver may include a plurality of image output units (not shown in FIG. 9) to output images of corresponding view points as necessary.

The broadcast receiver for displaying a stereoscopic image may further include a left view image output unit and a right view image output unit. In addition, one image output unit may control images of individual view points, and then display the resultant images on a screen.

The A/V decoder 9050 is a decoder for decoding base view video data for the 2D image output, and the Extension video decoder 9060 is a decoder for decoding extended view video data for the 3D image output.

The broadcast receiver may be operated in various ways according to methods for transmitting view branching metadata.

A method 'A' (9140 or 9150) indicates how the broadcast receiver is operated when view branching metadata is transmitted after being contained in an SEI message of a video stream. A method 'B' (9130) indicates how the broadcast receiver is operated when view branching metadata is transmitted after being contained in an additional PES packet.

Firstly, operations of the broadcast receiver when view branching metadata is contained in the SEI message of the video stream and is then transmitted will hereinafter be described in detail.

The broadcast receiver extracts a video stream PID from the PMT and TVCT information parsed from the PSI/PSIP processor 9040, and allows the TP demultiplexer 9030 to output a video stream using the corresponding video stream PID. If the output video stream corresponds to a base view video stream (AVC), the TP demultiplexer 9030 outputs the video stream to the A/V decoder 9050. If the output video stream corresponds to an extended view video stream (MVC extension), the TP demultiplexer 9030 outputs the video stream to the Extension video decoder 9060.

The A/V decoder 9050 and the Extension video decoder 9060 respectively process video data and supplemental data contained in the received video stream, and output the processed data to the 3D video processor 9070. In this case, the A/V decoder 9050 and the Extension video decoder 9060 process view branching metadata contained in the video stream, and thus output view point information.

The 3D video processor 9070 controls video data received from the A/V decoder 9050 and the Extension video decoder 9060 using view point information in response to each view point, and then outputs the controlled data.

The view point information may be output from at least one of the A/V decoder 9050 and the Extension video decoder 9060.

Operations of the broadcast receiver when view branching metadata is contained in an additional PES packet and then transmitted will hereinafter be described in detail.

The broadcast receiver extracts a PID of a PES packet including view branching metadata from the PMT and TVCT information parsed from the PSI/PSIP processor 9040, and allows the TP demultiplexer 9030 to output the PES packet (view branching segment) to the metadata processor 9080 using the corresponding PID.

The metadata processor 9080 processes the PES packet including view branching metadata, such that it outputs view point information to the 3D video processor 9070.

The 3D video processor 9070 controls video data received from the A/V decoder 9050 and the Extension video decoder 9060 using view point information in response to each view point, and then outputs the controlled data.

In one embodiment, the 3D video processor 9070 reconstructs a video stream in response to each view point, such that one video stream including a left view image may be output to the left view image output unit and the other video stream including a right view image may be output to the right view image output unit. In another embodiment, the 3D video processor 9070 may read video data of a corresponding view point from a video stream buffer (not shown) using the acquired view point information, and control the image output unit to output the read video data.

The method disclosed in the present invention may be implemented in the form of program commands executable by a variety of computer means, and recorded on a computer-readable recording medium. The computer-readable recording medium may include program commands, data files, data structures, etc. individually or in combination. The program commands recorded on the medium may be ones specially designed and configured for the present invention or ones known and available to those skilled in computer software. Examples of the computer-readable recording medium include magnetic media such as a hard disk, a floppy disk and a magnetic tape, optical media such as a compact disc read only memory (CD-ROM) and a digital versatile disc (DVD), magneto-optical media such as a floptical disk, and hardware devices specially configured to store and execute program commands, such as a ROM, a random access memory (RAM) and a flash memory. Examples of the program commands include high-level language codes that may be executed by a computer using an interpreter, etc., as well as machine language codes such as those produced by a compiler. The above-stated hardware devices may be configured to operate as one or more software modules to perform the operation of the present invention, and vice versa.

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

Mode for the Invention

Various embodiments have been described in the best mode for carrying out the invention.

INDUSTRIAL APPLICABILITY

As apparent from the above description, embodiments of the present invention may be wholly or partially applied to a digital broadcasting system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for controlling a video display output in a receiver operated in a three dimensional (3D) broadcast system, the method comprising:
   receiving a broadcast signal including a base video sequence and an extended video sequence,
   wherein the base video sequence includes first video sections having frames of left viewpoints for first scenes and second video sections having frames of right viewpoints for second scenes,
   wherein the first video sections and the second video sections are multiplexed in the base video sequence,
   wherein the extended video sequence includes third video sections having frames of right viewpoints of the first scenes and fourth video sections having frames of left viewpoints for the second scenes, and
   wherein the third video sections and the fourth video sections are multiplexed in the extended video sequence;
   extracting a supplemental enhancement information (SEI) message from the broadcast signal, wherein the SEI message includes viewpoint information specifying whether viewpoints of the frames correspond to a left viewpoint or a right viewpoint; and
   controlling a 2D video display output using the base video sequence for a 2D view mode.

2. The method of claim 1, further comprising:
   controlling a 3D video display output using both of the base video sequence and the extended video sequence according to the acquired viewpoint information for a 3D view mode.

3. The method of claim 2, wherein the base video sequence includes a base video view which can be decoded without referencing other video views, and the extended video sequence includes a non-base video view which can be decoded by referencing other video views.

4. The method of claim 1, wherein each of the first scenes corresponds to a scene for which a content provider intends to provide the left viewpoints of a 3D service when a viewer is watching the 3D service as a 2D service; and wherein each the second scenes corresponds to a scene for which the content provider intends to provide the right viewpoints of the 3D service when the viewer is watching the 3D service as the 2D service.

5. A receiver operated in a three dimensional (3D) broadcast system for controlling a video display output, the receiver comprising:
   a tuner for receiving a broadcast signal including a base video sequence and an extended video sequence,
   wherein the base video sequence includes first video sections having frames of left viewpoints for first scenes and second video sections having frames of right viewpoints for second scenes,
   wherein the first video sections and the second video sections are multiplexed in the base video sequence,
   wherein the extended video sequence includes third video sections having frames of right viewpoints of the first scenes and fourth video sections having frames of left viewpoints for the second scenes, and
   wherein the third video sections and the fourth video sections are multiplexed in the extended video sequence;
   a parser for extracting a supplemental enhancement information (SEI) message from the broadcast signal, wherein the SEI message includes viewpoint information specifying whether viewpoints of the frames correspond to a left viewpoint or a right viewpoint; and
   a display controller for controlling a 2D video display output using the base video sequence for a 2D view mode.

6. The receiver of claim 5, wherein the display controller is further:

controlling a 3D video display output using both of the base video sequence and the extended video sequence according to the acquired viewpoint information for a 3D view mode.

7. The receiver of claim 6, wherein the base video sequence includes a base video view which can be decoded without referencing other video views, and the extended video sequence includes a non-base video view which can be decoded by referencing other video views.

8. The receiver of claim 5, wherein each of the first scenes corresponds to a scene for which a content provider intends to provide the left viewpoints of a 3D service when a viewer is watching the 3D service as a 2D service, and wherein each the second scenes corresponds to a scene for which the content provider intends to provide the right viewpoints of the 3D service when the viewer is watching the 3D service as the 2D service.

* * * * *